(12) United States Patent
Smarto

(10) Patent No.: US 6,213,602 B1
(45) Date of Patent: *Apr. 10, 2001

(54) METAL BUS BAR AND TAB APPLICATION METHOD

(75) Inventor: John E. Smarto, Trafford, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/070,308

(22) Filed: Apr. 30, 1998

(51) Int. Cl.$^7$ ............... G02C 7/10; G02F 1/015
(52) U.S. Cl. ............................. 351/159; 359/245
(58) Field of Search ................. 351/159, 177; 359/245, 266

(56) References Cited

U.S. PATENT DOCUMENTS

| | | | |
|---|---|---|---|
| 3,630,603 | 12/1971 | Letter | 351/44 |
| 4,335,938 | 6/1982 | Giglia et al. | 350/357 |
| 4,978,208 | * 12/1990 | Hsu et al. | 351/45 |
| 5,187,607 | 2/1993 | Endo et al. | 359/266 |
| 5,327,281 | 7/1994 | Cogan et al. | 359/270 |
| 5,471,036 | * 11/1995 | Sperbeck | 359/512 |
| 5,471,338 | 11/1995 | Yu et al. | 359/273 |
| 5,520,851 | 5/1996 | Yu et al. | 252/518 |
| 5,618,390 | 4/1997 | Yu et al. | 204/192.26 |
| 5,657,150 | 8/1997 | Kallman et al. | 359/275 |

* cited by examiner

*Primary Examiner*—Cathy Lam
(74) *Attorney, Agent, or Firm*—Carol A. Marmo; William C. Mitchell

(57) ABSTRACT

A method for applying a conductive metal bus bar/tab system to the peripheral edge region of a substrate, such as an ophthalmic lens, is disclosed. The method involves: 1) applying conductive metal bus bar to said substrate; and 2) attaching a tab to said bus bar so as to ensure electrical contact between the tab and bus bar. Related devices are also disclosed.

31 Claims, 2 Drawing Sheets

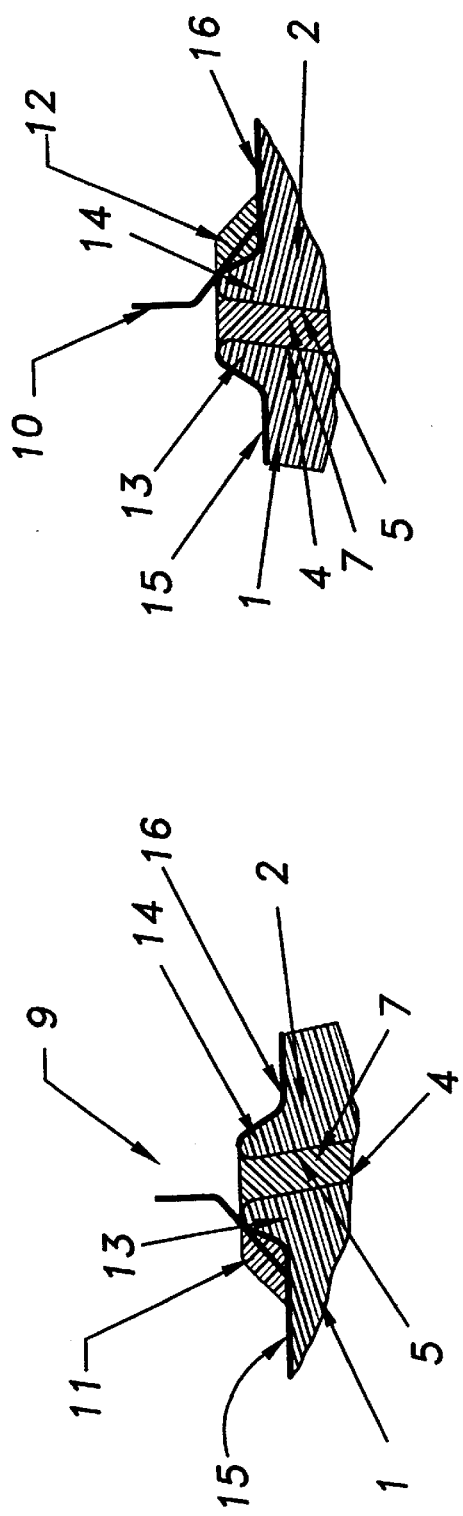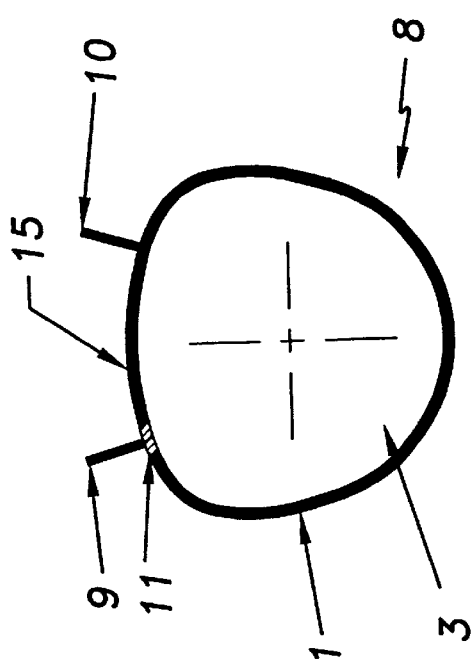

METAL BUS BAR AND TAB APPLICATION METHOD

FIELD OF THE INVENTION

This invention relates to a method for applying an electrical contact system to a substrate, and to the resulting metallized substrate. A preferred embodiment involves applying a tab to a conductive metal bus bar on an optical substrate, such as an ophthalmic lens, using a bonding agent and, if necessary, a conductive intermediate. The instant method is particularly useful in preparing electrooptic devices, such as electrochromic lenses.

BACKGROUND OF THE ART

The transmittance properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device facilitates reversible oxidation and reduction reactions during optical switching.

Conventional electrochromic cells comprise at least one thin film of a persistent electrochromic material, i.e. a material responsive to the application of an electric field of a given polarity to change from a high-transmittance, non-absorbing state to a low-transmittance, absorbing or reflecting state. Since the degree of optical modulation is directly proportional to the current flow induced by an applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, at least one electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell. As voltage is applied across the electrodes, ions are conducted through the ion-conducting material.

When the electrode adjacent to the electrochromic film is the cathode, application of an electric field causes darkening of the film. Reversing the polarity causes reversal of the electrochromic properties, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate. A complimentary electrochromic film, for example an iridium oxide film, can also be used.

An electrochromic device, such as an electrochromic lens, also requires a means for delivering electrical current from a power source to each of its electrodes. This can be accomplished via use of a bus bar, as disclosed in U.S. Pat. Nos. 5,520,851 and 5,618,390 to Yu, et al.

U.S. Pat. No. 5,471,338 to Yu, et al., discloses the use of a conductive silver epoxy bus bar to make electrical connection to an electrochromic device.

U.S. Pat. No. 3,630,603 to Letter discloses an electrochromic eyewear control circuit. U.S. Pat. No. 4,991,951 to Mizuno discloses metal eyeglass frames used in conjunction with electrooptic lenses.

U.S. Pat. No. 4,335,938 to Giglia discloses electrochromic devices having a layer of tungsten oxide in contact with a layer of organic electrolyte resin comprising a hydrophilic layer of 2-acrylamido-2-methylpropanesulfonic acid homopolymer and an electrode means for changing electrochromic properties of the device.

U.S. Pat. No. 5,327,281 to Cogan discloses the use of epoxy to seal a cavity formed when a spacer is used to separate electrodes and contains a liquid electrolyte injected between the spaced electrodes.

U.S. Pat. No. 5,657,150 to Kallman, et al., discloses electrochromic devices and the use of contacts connecting first and second electrodes to flex circuits or other means of wiring.

SUMMARY OF THE INVENTION

This invention is directed to a method for applying conductive metal bus bar/tab systems to various substrates and to the resulting metallized substrates. More particularly, this method involves applying a conductive metal bus bar and tab to the bus bar target area of a substrate having a peripheral edge region situated between first and second expanse surfaces in a manner which provides reliable electrical contact between the tab and bus bar, and which allows the bus bar and tab to be used as electrical conduits between a power source and an electrode disposed on the substrate, preferably on one of the substrates' expanse surfaces.

For example, in electrooptic applications, a bus bar comprising a conductive metal coating is applied to the peripheral edge region of an optical substrate having or which will have an electroconductive film on an adjacent expanse surface. The conductive metal coating and electroconductive film are disposed so as to overlap at or near the interface of the peripheral edge region and the expanse surface. The connecting portion of a tab, preferably its connecting end, is affixed to the metal coating in a manner which ensures electrical contact, for example via use of a suitable solder or conductive bonding agent, or a non-conductive bonding agent in conjunction with a conductive intermediate.

As used herein, the term 'bus bar' refers to a strip, coating or band of one or more low resistance, electrically conductive metals or metal alloys that is applied to a substrate. A bus bar is generally positioned so that it is in contact with or will contact an electroconductive material disposed on the substrate. As such, bus bars can be used to distribute electrical current from a power source across an electroconductive film. The term 'tab', as used herein, refers to a conductive wire or strip which links or connects a bus bar to a power source through a circuit, for example an electrooptic or electrochromic control circuit. A tab, which can be either an integral part or a separate component of such a circuit, is generally affixed to a bus bar at a connecting end, though this invention contemplates tab connection along any portion of its surface.

A conductive metal bus bar preferably is applied to the peripheral edge region of a substrate having or which will have a metal or metal oxide electroconductive film (e.g., fluorine-doped tin oxide, tin-doped indium oxide, antimony-doped tin oxide, aluminum-doped zinc oxide, etc.) on an adjacent expanse surface (hereinafter referred to as an electroconductive expanse surface). Electrical contact between the bus bar and an electroconductive film is preferably made at the interface of the peripheral edge region and an electroconductive expanse surface of a given substrate by causing the electroconductive film on the expanse surface to overlap the bus bar, or vice versa. It is desirable that a bus bar have a lower electrical resistance than the electroconductive film that it contacts. For example, bus bar sheet resistances of less than 20 ohms/sq. are preferred when electroconductive films having sheet resistances of 20–25 ohms/sq. are used.

In one embodiment of the instant invention, a conductive metal bus bar, e.g., a gold, chromium or silver-containing metal coating, is applied to the peripheral edge region of a shaped substrate using a conventional deposition technique, with masking as needed. As used herein, the term 'shaped substrate' refers to a substrate prepared by grinding or cutting the perimeter of an oversized blank substrate to a smaller size having a desired shape. This grinding process is commonly referred to as edging. For ophthalmic lenses, disk-shaped, oversized blank lenses are edged to shape via conventional techniques well known to skilled practitioners. The bus bar on such a shaped lens is usually confined to its peripheral edge region so that it is unobtrusive.

After application of the conductive metal coating to the bus bar target area of a substrate, a connecting portion of a tab, preferably a connecting end, is affixed to the metal coating so as to ensure electrical contact between the connecting portion of the tab and the conductive metal coating. The tab can be affixed by various connecting means, including but not limited to the use of conductive bonding agents, such as solders and conductive epoxies, or a non-conductive bonding agent in conjunction with a conductive intermediate. More particularly, the connecting portion of a tab can be soldered to a conductive metal bus bar, embedded in a conductive bonding agent layer positioned on a conductive metal bus bar, attached to a conductive metal bus bar using a conductive bonding agent or attached to a bus bar using a structural (non-conductive) bonding agent, followed by application of a conductive intermediate such as a conductive epoxy or paint which bridges the tab and the conductive metal coating, thereby establishing electrical contact between these components.

In another embodiment of the instant invention, a tab is applied or attached directly to the bus bar target area of a substrate using a suitable bonding agent, and a conductive metal bus bar is deposited over the tab or over a conductive material in contact with the tab. This embodiment also provides electrical contact between the tab and a conductive metal bus bar.

A preferred embodiment of the electrical contact system of the instant invention is illustrated in the Figures. As shown in FIGS. 3 and 4, the connecting ends of tabs 9 and 10 are embedded in conductive epoxy layers 11 and 12, respectively, which in turn are positioned on conductive metal bus bars 15 and 16. Bus bars 15 and 16 are deposited on the peripheral edge regions of shaped front and rear lenses 1 and 2, respectively, which are then laminated via a conventional lamination technique to form electrochromic lens 8, as shown in FIGS. 1 and 2.

BRIEF DESCRIPTION OF THE DRAWINGS

FIG. 2 is a front view of the laminated lens of FIG. 1 showing bus bar and tab orientation.

FIG. 3 is a cross-sectional blow-up of the front tab and bus bar of the lens shown in FIG. 1.

FIG. 4 is a cross-sectional blow-up of the rear tab and bus bar of the lens shown in FIG. 1.

DETAILED DESCRIPTION OF THE INVENTION

Figure 1:
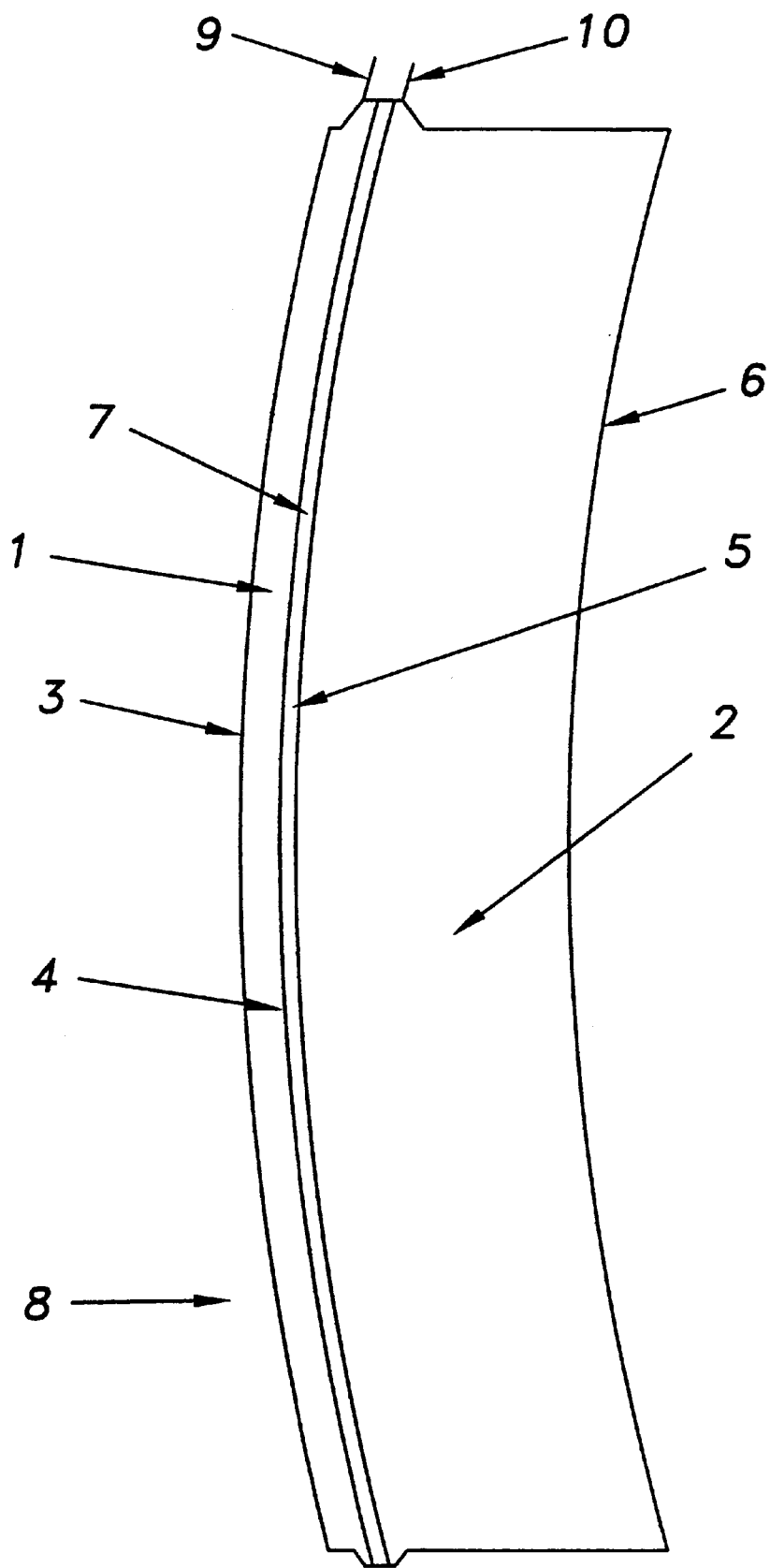
FIG. 1 is a side view of a laminated electrochromic lens showing front and rear lens tabs.

Other than in the operating Examples, or where otherwise indicated, all numbers quantifying ingredients, amounts, dimensions, ratios, ranges, reaction conditions, etc., used herein are to be understood as modified in all instances by the term 'about'.

In its broadest sense, the instant invention is directed to a method for applying or affixing a conductive metal bus bar/tab system to a substrate, which method comprises: a) applying a bus bar comprising a conductive metal coating to the bus bar target area of said substrate, preferably to the peripheral edge region of said substrate, via a suitable application means; and b) affixing, attaching or connecting the connecting portion of a tab to said bus bar via a connecting means which provides electrical contact between said tab and said bus bar. Thus, in various embodiments, a tab is connected to a conductive metal bus bar, e.g., a gold, silver, chromium or alloy-containing bus bar, via a soldering technique or by using a conductive or non-conductive bonding agent. If a non-conductive bonding agent is used, electrical contact is established between the tab and bus bar via use of a conductive intermediate.

Alternatively, the instant invention comprises: a) affixing, attaching or connecting the connecting portion of a tab to the bus bar target area of a substrate, using a suitable connecting means; and b) applying a bus bar comprising a conductive metal coating to said target area over the connecting portion of said tab via an application means which provides electrical contact between the tab and the conductive metal bus bar. If a conductive material such as a conductive epoxy covers the connecting portion of the tab affixed to the target area of the substrate, the conductive metal bus bar is preferably applied over the covering conductive material.

In a preferred embodiment of the instant invention, the connecting end or portion of a tab is attached to a conductive metal bus bar by embedding it in a conductive bonding agent layer, such as a curable conductive epoxy layer, disposed on the conductive metal bus bar. Curing of the conductive bonding agent secures the tab to the bus bar while linking them electrically. In other preferred embodiments, the connecting end or portion of a tab is attached to a conductive metal bus bar using a suitable solder or a suitable conductive bonding agent, such as a conductive epoxy.

Alternatively, the connecting end or portion of a tab can be bonded or attached to a conductive metal bus bar using a non-conductive bonding agent, such as a structural epoxy. A conductive intermediate, such as a conductive epoxy or paint, is then applied via a suitable application means over the connecting portion of the tab and a portion of the conductive metal bus bar to establish electrical contact between these components.

In still another embodiment of the instant method, the connecting end or portion of a tab is attached directly to the bus bar target area of a substrate (i.e., before the bus bar is applied) using a suitable attachment means. A conductive metal bus bar coating is applied, using a conventional deposition technique, over the connecting end or portion of the tab and onto the remaining bus bar target area, thereby establishing direct contact between the tab and the bus bar. Alternatively, if the connecting end or portion of the tab is applied to the substrate in a manner which covers it with or embeds it in a conductive material, the bus bar can be applied over the covered portion of the tab to establish electrical contact.

The instant invention is also directed to a substrate having a conductive metal bus bar and tab affixed to a bus bar target area via any of the instant methods. Such substrates, which preferably comprise a peripheral edge region situated between first and second expanse regions, can be used to prepare single stack electrooptic or electrochromic devices, wherein electrodes, electrochromic material(s) and possibly an ion-conducting material are coated as a stack on a first substrate which may or may not be laminated to a second substrate, and to prepare laminated electrooptic or electrochromic devices wherein first and second electrodes are coated on first and second substrates, respectively, each of which contains a bus bar. Multiple bus bars can be applied to a single substrate, if necessary. Preferred substrates are optical or ophthalmic lenses; more preferred substrates are shaped ophthalmic substrates.

Any suitable conductive metal can be used to form a conductive metal bus bar, including, for example, noble metals, alloys, silver plating and gold ink. Preferred bus bar materials include low resistivity metals such as gold, copper, chromium, tungsten, molybdenum and silver, alone or in combination. Gold (about 1000 to about 8000 Å thick) over chromium (about 100 to about 1000 Å thick) bus bars are preferred.

An effective amount of conductive metal is applied, i.e., that amount necessary to provide a bus bar of desired thickness and electrical resistance. Conductive materials can be applied via any conventional means, including, but not limited to, plating, rolling, brush application, vacuum evaporation and vacuum sputtering. Gold, copper, chromium or other conductive material metallization is preferably effectuated using vacuum evaporation or sputter deposition techniques.

Bus bar dimensions are generally determined by the substrate being coated, resistance requirements and the shape of the electroconductive film that a given bus bar contacts. Thus, a metal bus bar can cover a bus bar target area covering the full peripheral edge region of a substrate or it can be limited to some portion thereof. To avoid application of a metal bus bar beyond the targeted surface of a given substrate, the substrate can be mechanically masked so that only the desired bus bar target surface is exposed during bus bar application. It is also desirable that a bus bar adhere strongly to the substrate to which it is applied.

Any conductive bonding agent which adheres to and is compatible with the substrate being treated, which has workable cure characteristics (i.e., cure time, cure temperature, etc.) and which has suitable electrical conductivity properties can be used to attach the connecting portion or end of a tab to a conductive metal bus bar or to form a conductive bridge or conduit between a metal bus bar and tab. For example, conductive epoxies such as commercially available silver epoxies, nickel epoxies, chromium epoxies, gold epoxies, tungsten epoxies, alloy epoxies and combinations thereof are suitable. Preferred conductive epoxies are Tra-Duct® 2902 silver epoxy and Applied Technologies 5933 alloy (70/25/5 weight percent Ag/Au/Ni) epoxy, which are commercially available from Tra-Con, Inc., and Applied Technologies, respectively. Also, various solders can be used, preferably in combination with a compatible flux.

An effective amount of a conductive bonding agent is applied. This means, for example, that sufficient curable conductive epoxy is applied to affix a tab to a substrate or conductive metal bus bar, or to bridge a tab with its conductive metal bus bar. Conductive bonding agents can be applied by any suitable means, for example, by brush or extrusion. Such application means are well known to skilled practitioners. Similarly, an effective amount of a suitable solder is used. Various soldering techniques known in the art can be used. Fluxes can also be used to improve solder adherence.

Curable conductive epoxies usually comprise resin and harder components. These components are mixed prior to application in accordance with the relevant manufacturer's instructions. Curing is also preferably accomplished in accordance with manufacturer's instructions. Suitable conductive epoxies have cure times ranging from a few minutes to a few hours. An effective cure time is the time required for a given epoxy to cure to the extent that it becomes rigid enough to secure or electrically connect a tab to a bus bar and develops sufficient electrical conductivity.

Non-conductive bonding agents can also be used, noting, however, that a conductive intermediate will also be required. Preferred non-conductive bonding agents are structural epoxies having reasonable cure times/ temperatures which are compatible with the materials that they will contact. For example, cure times of between 0.5 min. and 24 hours are generally acceptable, as are cure temperatures between 4 and 150° C. An example of a suitable non-conductive bonding agent is Araldite 2012, which is commercially available from Ciba Geigy Corporation. Typically, structural epoxies are formed by combining resin and hardener components. Conventional combination techniques can be used to prepare the instant epoxies.

In a preferred embodiment, a conductive metal bus bar is applied to the peripheral edge region of a shaped substrate, i.e., a substrate which has been edged to shape using conventional edging/grinding techniques. The cross-sectional profile of the peripheral edge region to which a conductive epoxy bus bar is applied is not believed to be critical; the edge region profile can be, for example, flat, V-shaped, U-shaped, mesa shaped, square shaped, rounded or irregularly shaped. It is, however, desirable to avoid sharp edges in some applications, as they tend to concentrate stress. A particularly preferred embodiment requires that a blank substrate be edged to form a rounded or sloped transition zone between its peripheral edge region and its electroconductive expanse surface. Such a transition zone facilitates contact between an electroconductive film and a conductive epoxy bus bar. After application of a conductive metal bus bar to the peripheral edge region of a shaped substrate, the connecting end of a tab is embedded into a curable conductive epoxy layer situated on the conductive metal bus bar by inserting the tab end into the curable conductive epoxy layer, and then curing.

Tab location is not believed to be critical. Preferably, tabs are located so as to readily connect with corresponding circuitry. When a tab is embedded into a bonding agent, the connecting end or portion of the tab is preferably barbed, t-shaped, or otherwise irregularly shaped to help to secure the tab to the bus bar during the embedding step.

Any suitable wire or metal strip can be used as a tab. Preferably, a tab is sufficiently rigid to allow insertion into a pliable conductive epoxy layer, yet strong and pliable enough to be bent, shaped and/or connected to a circuit without breaking. Typical wire materials include, but are not limited to, nickel, silver, titanium, gold, platinum and copper. Such wires are commercially available from Aldrich, Inc., at 99.9% purity, by weight. Stainless steel tabs can also be used. Tab dimensions are not critical, and should be based on available space (e.g., the peripheral edge region width for a particular device) and resistance specifications. Generally, for electrochromic applications, wire resistances of less than about 2Ω across a 2 inch (5 cm) length are desired. Tab thickness generally ranges between 0.5 and 5 mils. If strips are used instead of wires, widths between 20 and 50 mils are typical.

Though the instant tab/bus bar application method is applicable to virtually any substrate, the preferred substrates of the instant invention are glass or organic polymeric substrates conventionally used to prepare optical lenses or electrochromic articles or devices. Preferably, polymeric organic substrates are used. For optical applications, substrates of the present invention are preferably prepared from transparent materials suitable for producing eyewear lenses, such as lenses prepared from synthetic organic optical resins are suitable. Alternatively, the substrate can be a non-transparent solid material.

Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold as CR-39® monomer by PPG Industries, Inc. Copolymers of the aforedescribed monomers/resins may also be used as a lens material. These and other transparent and non-transparent polymeric substrates known in the art for use for various optical and non-optical applications may be used.

After bus bar application, an electroconductive film is typically applied to an adjacent expanse surface of a metallized substrate using a conventional deposition technique. This electroconductive film preferably overlaps the bus bar, thereby providing electrical contact. Tin-doped indium oxide films are preferred electroconductive films, particularly those having an indium to tin weight ratio of about 90:10.

Laminated electrochromic eyeglass lenses can be prepared by bonding first and second lenses together, wherein each lens comprises an edged, transparent substrate which contains an electroconductive film, a bus bar and a tab. An electrochromic film is present on at least one of the lenses. Bonding is preferably accomplished by placing an effective amount of a curable ion-conducting polymer (ICP) composition, i.e. a monomer solution comprising one or more monomers an effective amount of an initiator and optionally up to one or more non-reactive diluents and/or additives, on the concave interface surface of a matched lens pair and bringing this concave surface and the convex surface of the corresponding lens together, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow.

A preferred embodiment is now described by reference to the Figures. FIG. 1, which is not drawn to scale, shows a side view of laminated electrochromic lens 8 containing ion-conductive polymer (ICP) layer 7. In lens 8, shaped substrate 1 is the front lens of laminated electrochromic lens 8. Shaped substrate 1 has a front expanse surface 3 and an electroconductive expanse surface 4. The coatings on electroconductive expanse surface 4 are not shown; these are conventional electroconductive and electrochromic coatings used in the preparation of electrochromic lenses and are not critical to the instant invention. Laminated to shaped substrate 1 is shaped substrate 2, which is the rear lens. Shaped substrate 2 has an electroconductive expanse surface 5 and a rear expanse surface 6. The coatings on electroconductive expanse surface 5 are not shown; these are conventional electroconductive and electrochromic coatings used in the preparation of electrochromic lenses and are not critical to the instant invention. Ion-conducting polymer layer 7 is disposed between shaped substrates 1 and 2; this layer serves as both an ion-conducting electrolyte and a mechanical adhesive which bonds shaped substrates 1 and 2. Tabs 9 and 10 are affixed to the peripheral edge regions of shaped substrates 1 and 2, as shown in greater detail in FIGS. 2–4.

FIGS. 2, 3 and 4 are not drawn to scale. These figures show nubs 13 and 14 on the peripheral edge region of shaped substrates 1 and 2, respectively. Conductive metal bus bars 15 and 16 are positioned on nubs 13 or 14 of shaped substrates 1 and 2, respectively. The connecting end of tab 9 is embedded in conductive epoxy layer 11 and the connecting end of tab 10 is embedded in conductive epoxy layer 12. Tabs 9 and 10 can be situated anywhere on bus bars 15 and 16, but are generally located so as to enable convenient connection to related circuitry (not shown). Though edge shaping is not critical to the instant invention, nubs 13 and 14 represent preferred embodiments. These nubs are excellent bus bar foundations and can interlock with various edge seals. Preferably, tabs are positioned on sloped nub surfaces.

EXAMPLES

The present invention is more particularly described in the following Example, which is intended to be illustrative only since numerous modifications and variations therein will be apparent to those skilled in the art.

Example 1

Tab Application

The peripheral edge regions of two (2) shaped 1–2 mm thick clear optical lenses prepared from CR-39® monomer were coated with chromium and gold, 1000 and 6000 Å thick, respectively, using conventional sputter deposition techniques. The resulting gold/chromium bus bars covered the full peripheral edge regions of each lens.

Two (2) commercially available gold-plated nickel tabs 0.0005 in (0.013 mm) thick by 0.04 inch (1.0 mm) wide were cleaned and dried via conventional techniques and cut to 0.25 inch (6.4 mm) lengths. These tabs were then attached to the bus bars of the above-described lenses by the following techniques:

A. Structural Epoxy
  1. One of the lenses was placed on a tab location template and marked accordingly. With the aid of a microscope, a small amount of Araldite 2012 structural epoxy was applied to the marked tab location on its chromium/gold bus bar.
  2. The connecting end of the tab was placed onto the Araldite 2012, and the epoxy was cured, in accordance with the manufacturer's instructions, which attached the tab to the bus bar.

3. After tab application, a thin layer of Tra-Duct® 2902 silver epoxy was applied across the portion of the tab affixed to the lens, assuring that any Araldite 2012 which may have seeped around the tab was covered. The silver epoxy layer extended onto the gold/chromium bus bar.

4. The tabbed lens was placed in an oven at 50° C. to cure the silver epoxy, and a tabbed lens was removed from the oven.

B. Solder

1. The second lens was placed on the tab location template and marked accordingly. A thin film of liquid rosin flux, commercially available from Metron, Inc., was applied to the connecting end of the tab and to the marked portion of the bus bar.

2. After application of a 60/40 Sn/Pb solder (commercially available from Radio Shack) to the connecting portion of the tab using a soldering iron, the tab was placed, solder side down, on the bus bar. The soldering process was completed by briefly touching the soldering iron to the top of the tab, opposite the solder. This resulted in a tabbed lens.

I claim:

1. A substrate containing a conductive metal bus bar and an electrically conductive tab attached to said bus bar using a conductive bonding agent, wherein said conductive bonding agent is in electrical contact with said tab and bus bar.

2. The substrate of claim 1, wherein said tab has a connecting portion which is embedded in said conductive bonding agent.

3. The substrate of claim 1, wherein said tab is a wire.

4. The substrate of claim 2, wherein said tab is a wire.

5. The substrate of claim 1, wherein said conductive bonding agent is a conductive epoxy.

6. The substrate of claim 5, wherein said tab has a connecting portion which is embedded in said conductive epoxy.

7. The substrate of claim 6, wherein said tab is a wire.

8. The substrate of claim 1, wherein said substrate comprises a component of an electrooptic device.

9. The substrate of claim 8, wherein said component is an optical lens.

10. A substrate containing a conductive metal bus bar and an electrically conductive tab attached to said bus bar using solder, wherein said tab and bus bar are in electrical contact.

11. The substrate of claim 10, wherein said tab is a wire.

12. The substrate of claim 10, wherein said substrate comprises a component of an electrooptic device.

13. The substrate of claim 12, wherein said component is an optical lens.

14. A substrate containing a conductive metal bus bar which is applied to said substrate, and an electrically conductive tab attached to a portion of said bus bar using a non-conductive bonding agent, wherein a conductive intermediate is applied over at least a connecting portion of said tab and at least a portion of said conductive metal bus bar so as to establish electrical contact between said tab and said bus bar.

15. The substrate of claim 14, wherein said non-conductive bonding agent is an epoxy bonding agent.

16. The substrate of claim 14, wherein said conductive intermediate is a conductive epoxy.

17. The substrate of claim 15, wherein said conductive intermediate is a conductive epoxy.

18. The substrate of claim 14, wherein said tab is a wire.

19. The substrate of claim 17, wherein said tab is a wire.

20. The substrate of claim 14, wherein said substrate comprises a component of an electrooptic device.

21. The substrate of claim 20, wherein said component is an optical lens.

22. The substrate of claim 14, further comprising an electroconductive film disposed on said substrate and over at least a portion of said conductive metal bus bar.

23. The substrate of claim 16, further comprising an electroconductive film disposed on said substrate and over at least a portion of said conductive bus bar.

24. A substrate having an electrically conductive tab which is attached to said substrate using a bonding agent, and a conductive metal bus bar applied over said electrically conductive tab, wherein said tab and bus bar are in electrical contact.

25. The substrate of claim 24, wherein said bonding agent is an epoxy.

26. The substrate of claim 25, wherein said epoxy in a non-conducting epoxy.

27. The substrate of claim 24, further including an electroconductive film disposed on said substrate and over at least a portion of said conductive metal bus bar.

28. The substrate of claim 25, further including an electroconductive film disposed on said substrate and over at least a portion of said conductive metal bus bar.

29. The substrate of claim 24, wherein said substrate comprises a component of an electrooptic device.

30. The substrate of claim 29, wherein said component is an optical lens.

31. A substrate having an electrically conductive tab which is attached to said substrate using a bonding agent, wherein a conductive material is disposed over at least a connecting portion of said tab so as to connect a portion of said tab to said substrate, and a conductive metal bus bar wherein said bus bar is applied over said conductive material.

* * * * *